(12) United States Patent
Ueno

(10) Patent No.: US 7,540,217 B2
(45) Date of Patent: Jun. 2, 2009

(54) CABLE WINDING CONVERSION DEVICE

(75) Inventor: Koken Ueno, Sakai (JP)

(73) Assignee: Shimano Inc., Osaka (JP)

( * ) Notice: Subject to any disclaimer, the term of this patent is extended or adjusted under 35 U.S.C. 154(b) by 788 days.

(21) Appl. No.: 11/068,436

(22) Filed: Mar. 1, 2005

(65) Prior Publication Data
US 2005/0284979 A1 Dec. 29, 2005

(30) Foreign Application Priority Data
Jun. 3, 2004 (JP) ............................. 2004-166171

(51) Int. Cl.
*F16C 1/26* (2006.01)
(52) U.S. Cl. .................................................. 74/502.6
(58) Field of Classification Search ................... 74/489, 74/500.5, 501.5 R, 502.2, 502.4, 505, 506; 242/388.2, 615.2, 615.3; 24/115 R
See application file for complete search history.

(56) References Cited

U.S. PATENT DOCUMENTS

| | | | | |
|---|---|---|---|---|
| 4,165,053 | A | * | 8/1979 | Konig ...................... 242/378.3 |
| 4,502,570 | A | * | 3/1985 | Westerlund ................. 187/264 |
| 4,817,452 | A | | 4/1989 | Burkey |
| 5,438,889 | A | | 8/1995 | Tagawa |
| 5,941,339 | A | * | 8/1999 | Shimizu et al. ............. 180/444 |
| 6,453,766 | B1 | | 9/2002 | Ose |
| 2003/0073528 | A1 | | 4/2003 | Gioia |
| 2003/0172771 | A1 | | 9/2003 | Nanko et al. |

FOREIGN PATENT DOCUMENTS

| | | |
|---|---|---|
| EP | 0185642 A1 | 6/1986 |
| EP | 0647556 A2 | 4/1995 |
| EP | 1 318 071 A2 | 6/2003 |
| JP | S57-117738 U | 7/1982 |
| JP | H6-48366 A | 2/1994 |
| JP | 2000-159182 A | 6/2000 |
| JP | 3431555 B2 | 5/2003 |

* cited by examiner

*Primary Examiner*—Vicky A Johnson
(74) *Attorney, Agent, or Firm*—Global IP Counselors, LLP

(57) ABSTRACT

A cable winding conversion device is provided that enables relatively easy placement on a frame such as a bicycle frame between a pair of cables. The cable winding conversion device basically includes a base member, a first winder, a second winder, a first cable mounting portion, and a second cable mounting portion. The base member is configured to be mounted to a frame. The first and second winders are rotatably mounted to the base member to wind first and second inner wires of the first and second cables. The second winder has at least a portion with a winding radius larger than the first winder. The first cable mounting portion directs the first cable. The second cable mounting portion directs the second cable. The second cable mounting portion includes a cable receiving opening that is directed toward a rotation center of the winders.

18 Claims, 6 Drawing Sheets

CABLE WINDING CONVERSION DEVICE

CROSS-REFERENCE TO RELATED APPLICATIONS

This application claims priority to Japanese Patent Application No. 2004-166171. The entire disclosure of Japanese Patent Application No. 2004-166171 is hereby incorporated herein by reference.

BACKGROUND OF THE INVENTION

1. Field of the Invention

The present invention generally relates to a cable winding conversion device that is designed to be placed between first and second cables that have first and second inner wires slidably mounted within first and second outer casings, respectively. More specifically, the present invention relates to a cable winding conversion device with different winders for the different inner wires with at least one of the inner wires being directed toward the rotation center of the winders.

2. Background Information

A cable known as a Bowden cable has an outer casing that allows the passage of an inner wire. This type of cable is widely used as an operation cable in bicycles, motorcycles, and cars. For this type of cable, a cable winding conversion device is often used between two cables in order to modify the travel of the inner wire of a second cable which is based on the travel of the inner wire of a first cable. The first cable is connected to a movement or control mechanism.

Conventional cable winding conversion devices have a base member, a first winder that is mounted to the base member to wind/unwind an inner wire of the first cable, and a second winder that pivots with the first winder to wind/unwind an inner wire of the second cable. In addition, the first and second winders have first and second cable winding grooves that guide the inner wires of the first and second cables around the peripheries of the first and second winders, respectively. These devices are configured so that at least a part of winding radius of the first and second cable winding grooves is different from each other. The base member typically includes first and second cable mounting parts that hold (lock) the outer casings of the first and second cables separately, respectively. The first and second cable mounting parts are placed in directions that meet the cable winding grooves.

In conventional cable winding conversion devices with this kind of configuration, the first winder pivots when the inner wire of the first cable is operated (moved) by the movement or control mechanism. The second winder pivots in response to this movement of the first winder, and the inner wire of the second cable moves. When this movement occurs, because at least parts of the winding radius of cable winding grooves of both winders differ, the movements of inner wires of the first and second cables are different.

Unexamined Japanese utility model specification No. S57-117738 discloses one example of a convention cable winding conversion device such as that explained above.

In view of the above, it will be apparent to those skilled in the art from this disclosure that there exists a need for an improved cable winding conversion device. This invention addresses this need in the art as well as other needs, which will become apparent to those skilled in the art from this disclosure.

SUMMARY OF THE INVENTION

When placing two cables and a cable winding conversion device on a frame, it is better to linearly place two cables to distribute them in a compact manner. However, in the conventional structure, since the cable mounting parts are set up toward tangent lines of the cable winding grooves, the cables are also placed toward the tangent lines of the winding grooves. Therefore, if the two cables are linearly placed, the two cables will be largely misaligned from each other and the pivoting center of the winders. When the cables and the pivoting center are widely misaligned, and the cables are separated from the pivoting center of the winders, it becomes difficult to place the cables and the base member on the frame, especially when the frame has relatively narrow tubes such as in a bicycle frame. In other words, it becomes difficult to place the base member on the frame and the cables on the frame in optimal locations with these prior devices, especially when the cable winding conversion device is mounted on a frame that uses a lot of thin pipes like a bicycle because parts where the base member and cables can be mounted (placed) are limited. Accordingly, due to the potential difficulty in mounting the cables and the base member on a thin frame, there is a risk that bracket(s) or other additional mounting structures will be needed on the frame to support the cables and/or the base member.

One object of the present invention is to provide a cable winding conversion device that converts the travel of a first cable into a different amount of travel of a second cable.

Another object of the present invention is to provide a cable winding conversion device that enables relatively easy placement of the cables and a base member supporting the cable winding conversion device on a frame, especially a bicycle frame.

Another object of the present invention is to provide a cable winding conversion device that enables the cable winding conversion device to be mounted on the frame without the need for additional brackets or the like.

Yet another object of the present invention is to provide a cable winding conversion device that is relatively simple an inexpensive to manufacture, assemble and mount to a frame, especially a bicycle frame.

The foregoing objects can basically be attained by providing a cable winding conversion device in accordance with a first aspect of the present invention. The cable winding conversions device in accordance with the first aspect of the present invention basically includes a base member, a first winder, a second winder, a first cable mounting portion, and a second cable mounting portion. The base member is configured to be mounted to a frame. The first winder is rotatably mounted to the base member. The first winder is configured to wind a first inner wire of a first cable. The second winder is fixedly mounted to the first winder to move with the first winder. The second winder is configured to wind a second inner wire of a second cable. The second winder has at least a portion that has a winding radius that is larger than a winding radius of the first winder. The first cable mounting portion is coupled to the base member to direct the first inner wire of the first cable onto the first winder. The first cable mounting portion is configured to receive a first outer casing of the first cable. The first cable mounting portion includes a first cable receiving opening. The second cable mounting portion is coupled to the base member to direct the second inner wire onto the second winder. The second cable mounting portion is configured to receive a second outer casing of the second cable. The second cable mounting portion includes a second cable receiving opening that is directed toward a rotation center of the first and second winders.

In this cable winding conversion device, the first cable mounting portion is placed on the base member placed on the frame, and the second cable mounting portion is placed on the base member toward the pivoting (rotation) axis of the second winder. The first winder pivots as the first cable moves, then in response to this movement, the second winder pivots, and the second cable moves. At this point, since at least a part of the winding radius of the second winder is larger than the winding radius of the first winder, the travel of both inner wires is different. In this case, the second cable can be placed toward the pivoting center because the second cable mounting portion of the second cable that at least a part of the winding radius is larger than the first cable, and the winding position is widely separated from the pivoting center, is placed toward the pivoting axis of the second winder. Therefore, even if the first cable mounting portion is placed along the tangent line of the first winder, the distance between the cable and the pivoting center is determined by the distance between the first cable and the pivoting center. Therefore, the distance between the cable and the pivoting center can be closer, and it becomes easier to place the cable on the frame even if the base member is placed in the frame, and the cable and the base member can be easily placed even on a thin frame.

In a cable winding conversion device in accordance with a second aspect of the present invention, the first cable mounting portion is mounted in a position relative to the first winder such that the first cable receiving opening is directed substantially tangentially relative to a first winding surface of the first winder. In this case, even if the first cable is placed along the tangent line of the first winder, the cable and the base member are easily placed on the frame.

In a cable winding conversion device in accordance with a third aspect of the present invention, the first cable mounting portion is mounted in a position relative to the first winder such that the first cable receiving opening is directed toward the rotation center of the first and second winders. In this case, since the first cable mounting portion is also placed toward the pivoting axis, the cable and the pivoting axis can be set in line, and the cable and the base member are more easily placed on the frame.

A cable winding conversion device in accordance with a fourth aspect of the present invention, the base member includes a first cable guide part arranged between the first cable receiving opening and the first winder to guide the first inner wire substantially tangentially onto a first winding surface of the first winder. In this case, since the first inner wire, that has a curvature from the first cable mounting portion placed toward the pivoting center to the direction of the tangent line of the first winder, is guided to the first cable guide part, the movement of the first inner wire is smoothed, and lowering of the conversion efficiency by friction can be inhibited.

A cable winding device in accordance with a fifth aspect of the present invention, the base member includes a second cable guide part arranged between the second cable receiving opening and the second winder to guide the second inner wire substantially tangentially onto a second winding surface of the second winder. In this case, since the second inner wire, that has a curvature from the second cable mounting portion placed toward the pivoting center to the direction of the tangent line of the second winder, is guided to the second cable guide part, the movement of the second inner wire is smoothed, and lowering of the conversion efficiency by friction can be inhibited.

In a cable winding device in accordance with a sixth aspect of the present invention, the first and second cable guide parts include first and second guide rollers, respectively, and the first and second guide rollers are rotatably mounted to the base member. In this case, since the guide rollers turn according to the movement of the inner wire, the inner wire moves more smoothly, and lowering of the conversion efficiency by friction can be inhibited.

In a cable winding conversion device in accordance with a seventh aspect of the present invention, the first and second winders are circular shaped members with different winding radii as viewed along the rotation center of the first and second winders, and the first and second winders include first and second winding grooves to guide the first and second inner wires around the circumferences thereof, respectively. In this case, the production of two winders becomes easy. In accordance with this aspect of the present invention, the circular shaped winders can have their centers aligned with the rotation center of the winders, or at least one of the circular winders can have its center offset from the rotation center of the winders to be eccentric relative to the rotation axis of the winders.

In a cable winding conversion device in accordance with an eight aspect of the present invention, at least one of the first and second winders has a first portion and a second portion with a distance between the rotation center and an outer peripheral edge of the second portion being different from the first portion. In this case, due to the arrangement of the first and second portions, the travel of at least one of the inner wires relative to the other inner wire can be changed during pivoting of the winders.

In a cable winding conversion in accordance with a ninth aspect of the present invention, at least one of the first or second winders has a circular shape with its center off-set from the rotation center of the first and second winders. In this case, the travel of at least one of the inner wires relative to the other inner wire can be changed during pivoting of the winders by making the at least one of the winders eccentric relative to the rotation axis (pivoting center).

In a cable winding conversion device in accordance with a tenth aspect of the present invention, at least one of the first and second winders has a varying winding radius that gradually changes. In this case, the travel of at least one of the inner wires relative to the other inner wire can be changed during pivoting of the winders by using a varying distance from the pivoting center to the outer circumference, which gradually changes on the at least one of winders.

According to the present invention, the second cable can be placed toward the pivoting center because the second cable mounting portion (locking part) of the second cable, that at least a part of winding radius is larger than the first cable and the winding position is widely separated from the pivoting center, is placed toward the pivoting axis of the second winder. Therefore, the distance between the cable and the pivoting center is determined by the distance of the first cable, even if the first cable mounting portion (locking part) is placed as it would be conventionally, along the tangent line of the first winder. Therefore, the distance between the cable and the pivoting center can be brought closer, it becomes easier to place the cables on the frame even if the base member is placed on the frame, and the cables and the base member can be easily placed on (mounted to) the frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
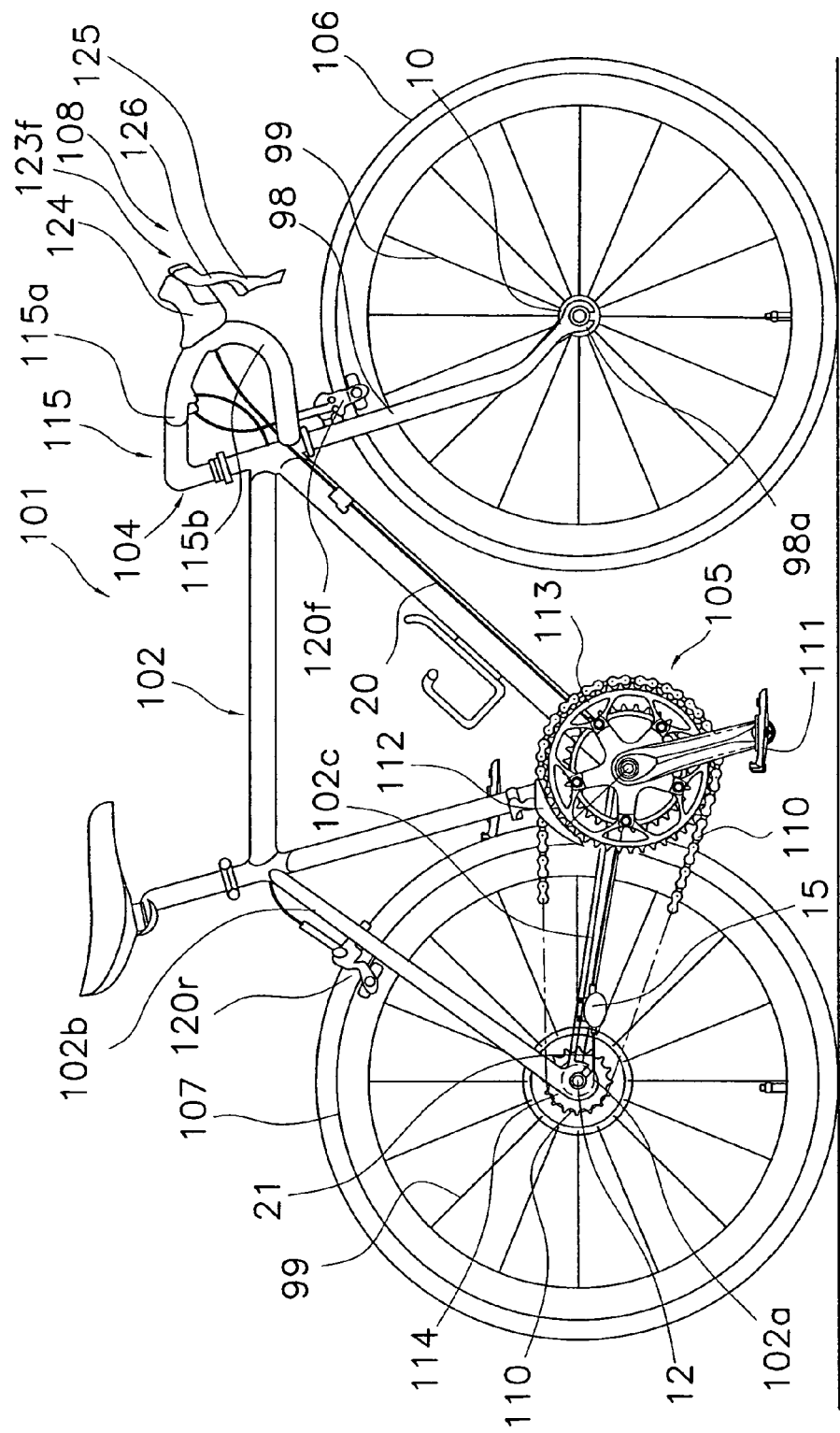
FIG. 1 is a side elevational view of a bicycle equipped with a cable winding conversion device in accordance with a first embodiment of the present invention.

Referring initially to FIG. 1, a bicycle 101 with a cable winding conversion device 15 is illustrated in accordance with a first embodiment of the present invention. The cable winding conversion device 15 is arranged between an internal gear change rear hub 12 and shift operating mechanism 126 to convert the amount of travel of a first shift or speed control cable 20 to a different amount of travel of a second shift or speed control cable 21. Specifically, the first shift cable 20 is operatively coupled between the shift operating mechanism 126 and the cable winding conversion device 15, while the second shift cable 21 is operatively coupled between the cable winding conversion device 15 and the interior speed hub 12. The shift operating mechanism 126 is originally designed for use with a rear derailleur requiring different cable travel to effect proper shifting than the interior speed hub 12. Thus, the cable winding conversion device 15 is provided for compatibility between the shift operating mechanism 126 and the interior speed hub 12. Thus, the shift operating mechanism 126 or any other conventional shifter designed for use with a rear derailleur can be used with the interior speed hub 12.

The bicycle 101 is illustrated as a road racer (i.e. a road type bicycle) for convenience. However, the present invention can be applied to any type of bicycle as needed and/or desired. The bicycle 101 has a diamond-shaped frame 102, a handlebar assembly 104 a drive train 105, a front wheel 106, a rear wheel 107 and a braking system 108. A front fork 98 is pivotally mounted to the frame 102. The handlebar assembly 104 is attached to the front fork 98 to steer the bicycle 101 via the front wheel 106. The drive train 105 basically includes a chain 110, a pair of pedals 111, a front derailleur 112, at least one front sprocket 113 (preferably a pair of front sprockets) and a rear sprocket 114.

The front sprocket(s) 113 is fixedly attached to a front crank assembly in a conventional manner. The pedals 111 are rotatably coupled to a pair of crank arms of the crank assembly in a conventional manner. Thus, the crank arms are located on opposite lateral sides of the bicycle 101. The rear sprocket 114 is coupled to the rear wheel 107 in a conventional manner. The chain 110 is received on the front sprocket(s) 113 and the rear sprocket 114 in a conventional manner such that the chain 110 is cycled when the rider moves the pedals to rotate the front crank assembly, and thus, rotates the front sprocket(s) 113 in a conventional manner. The front derailleur 112 is used to selectively shift the chain 110 laterally between the front sprockets 113.

The front and rear wheels 106 and 107 are mounted between front fork ends or legs 98a of the front fork 98 and between rear fork (triangle) ends or legs 102a of the frame 102, respectively, in a conventional manner. Each of the wheels 107 and 108 has a plurality of spokes 99. The spokes 99 of the front wheel 107 extend between a front hub 10 and the front wheel rim in a conventional manner, while the spokes 99 of the rear wheel 108 extend between the rear (internal speed/gear) hub 12 and the rear wheel rim in a conventional manner. The braking system 108 is configured to apply a braking force to the front and/or rear wheel rims of the front and/or rear wheels 107 and 108, respectively, in a conventional manner. The rear hub 12 is an interior speed change hub that has a plurality of internal gears (not shown). For example, the rear hub can have eight-gears or speeds. The rear sprocket 114 is mounted to the rear hub 12 such that it is operatively coupled to the internal gear mechanism of the rear hub 12 in a conventional manner. Thus, the rear hub 12 forms part of the drive train 105. The rear hub is relatively conventional. Thus, the rear hub 12 will not be explained and/or illustrated in detail herein, except as related to the present invention.

The handlebar assembly 104 has a handlebar 115 that is common drop-shape, which is mounted to the front fork 98 via a stem in a conventional manner. Thus, the handlebar 115 includes a transverse center part 115a and a pair of curved end parts 115b arranged at opposite ends of the center part 115a. The center part 115a is laid horizontally such that it is transverse to the travel direction of the bicycle 101. The pair of curved end parts (curvature parts) 115b first extend toward the front of the bicycle 101 as the curved end parts 115b extend away from the center part 115a at both ends of the center part 115a, and then curve downwardly and then rearwardly in a conventional manner.

The braking system 108 includes a front braking device 120f, a rear braking device 120r, a front brake operating mechanism 123f and a rear brake operating mechanism (not shown). The front and rear braking devices 120f and 120r are mounted on the front fork 98 and a back seat stay portion 102b of the frame 102. The front and rear braking devices 120f and 120r selectively apply a braking force to the front and/or rear wheel rims of the front and/or rear wheels 107 and 108, respectively, in a conventional manner. The front braking operation mechanism 123f and the rear brake operating mechanism (not shown) are attached to the curved end parts 115b of the handlebar 15 to operate the braking devices 120f and 120r. In particular, a pair of conventional brake cables that operatively connect the braking devices 120f and 120r to the front braking operation mechanism 123f and the rear brake operating mechanism (not shown) in a conventional manner.

The braking operation mechanism 123f includes a bracket 124, a brake lever 125 and a shift control mechanism (speed control part) 126. The bracket 124 is fixed to one of the curved end parts 115b of the handlebar 115. The brake lever 125 is mounted to the bracket 124 in a longitudinally pivotal manner to control braking and in a laterally pivotal manner to control shifting. The shift control mechanism (speed control part) 126 is operatively coupled with the brake lever 125 to control the interior speed hub 12. The shift operating mechanism 126 controls the speed (gear ratio) of the interior speed hub 12 by lateratally swinging (pivoting) the brake lever 125.

However, the shift operating mechanism 126 is conventional and originally designed to control a conventional rear derailleur. A conventional rear derailleur is typically designed to be actuated with a different amount of cable travel than the interior speed hub 12. Thus, the shift operating mechanism 126 cannot properly control the speed (gear ratio) of the interior speed hub 12 without some type of conversion device the changes the amount of travel of the shift cable extending from the conventional shift operating mechanism 126. Accordingly, the cable winding conversion device 15 of the present invention is mounted on a chain stay portion 102c at the back of the frame 102 between the interior speed hub 12 and the shift operating mechanism 126 to change the travel of the second shift cable 21 to something different from the travel of the first shift cable 20.

Figure 2:
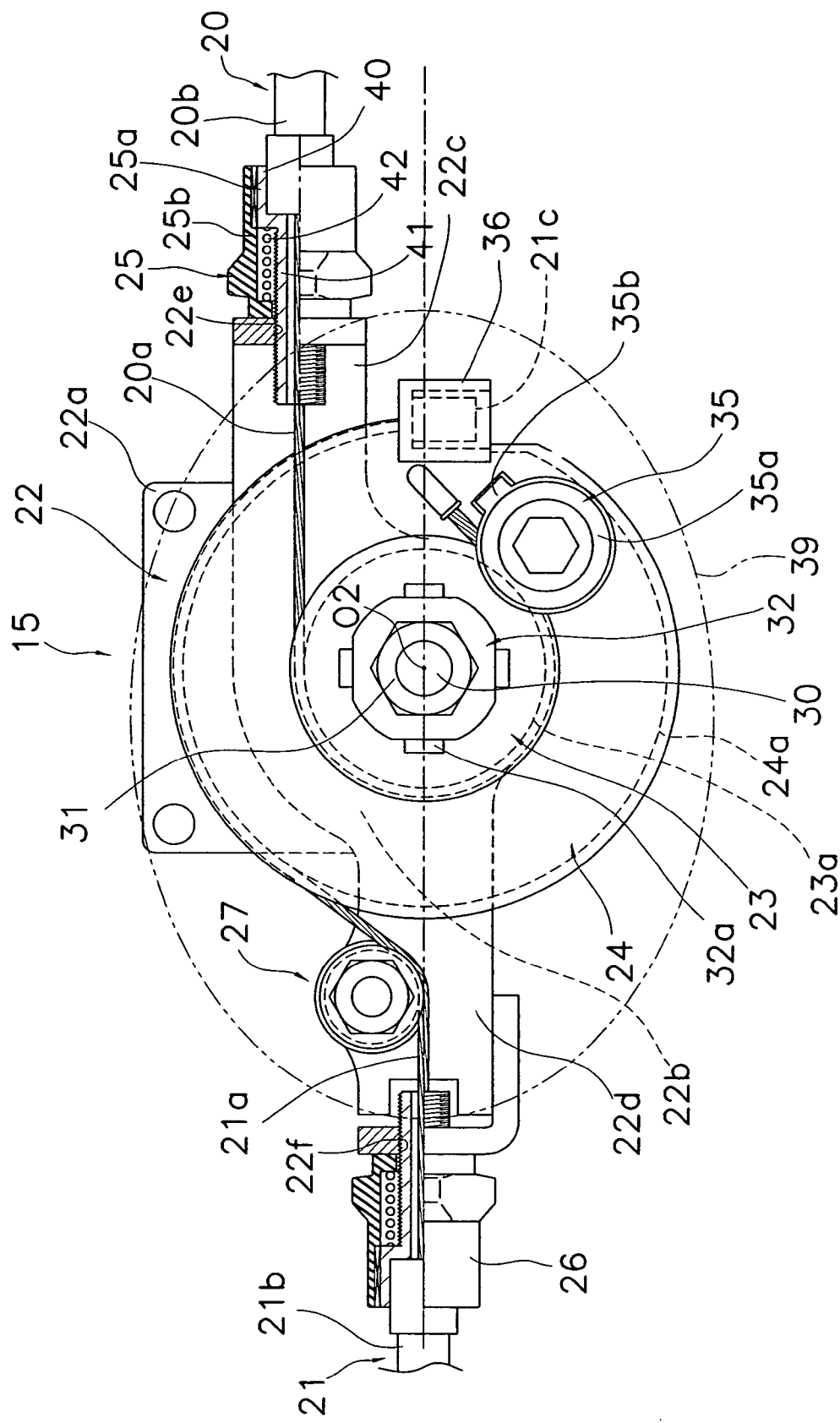
FIG. 2 is an enlarged side elevational view of the cable winding conversion device illustrated in FIG. 1, with portions removed and portions broken away for the purpose of illustration (i.e. a flat/top part sectional view)

The cable winding conversion device 15 is mounted on the chain stay portion 102c between the first shift cable 20 and the second shift cable 21, as best shown in the FIGS. 1 and 2. Specifically, the first shift cable 20 includes a first inner wire 20a and a first outer casing 20b that are connected to the shift operating mechanism 126 and the cable winding conversion device 15. Similarly, the second cable 21 includes a second inner wire 21a and a second outer casing 21b that are connected to the interior speed hub 12 and the cable winding conversion device 15. The cable winding conversion device 15 is arranged and configured to change the travel of the second inner wire 21a relative to the travel (pull volume) of the first inner wire 20a. In the illustrated embodiment, the cable winding conversion device 15 is arranged and configured to increase the travel of the second inner wire 21a relative to the travel (pull volume) of the first inner wire 20a. The first and second shift cables 20 and 21 are conventional Bowden type cables that are well known in the bicycle art. Thus, the first and second cables 20 and 21 will not be discussed and/or illustrated in detail herein except as related to the present invention.

Figure 3:
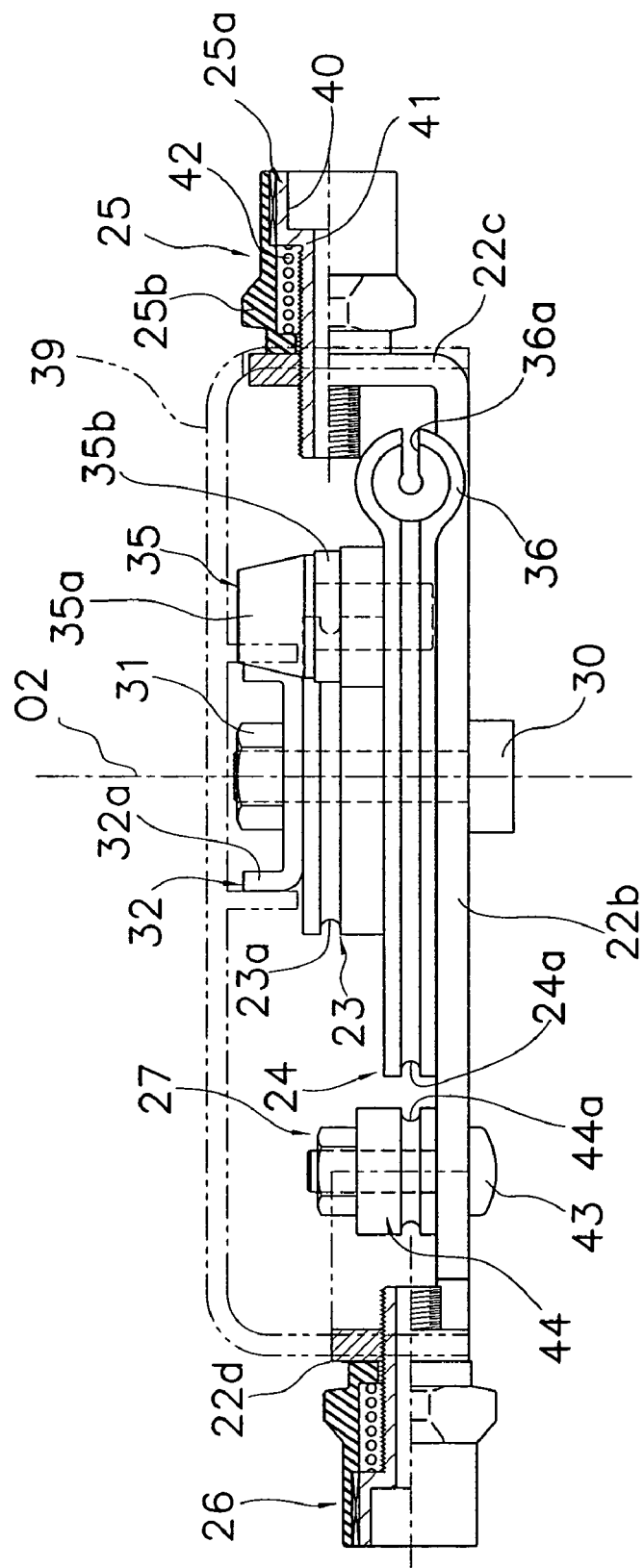
FIG. 3 is a bottom elevational view of the cable winding conversion device illustrated in FIG. 2, with portions removed and portions broken away for the purpose of illustration (i.e. an end/side part sectional view)

The cable winding conversion device 15, as shown in the FIGS. 2 and 3, basically includes a base member 22, a first winder 23, a second winder 24, a first barrel adjuster 25 and a second barrel adjuster 26. The base member 22 is fixedly attached to the chain stay portion 102c. The first winder 23 is rotatably mounted to the base member 22 (i.e. in a pivoting manner). The second winder 24 is fixedly mounted (attached) to the first winder 23. Thus, the second winder 24 is rotatably mounted to the base member 22 to move/pivot with the first winder 23. The first barrel adjuster 25 is adjustably mounted to one end of the base member 22, while the second barrel adjuster 26 is adjustably mounted to the opposite end of the base member 22 from the first barrel adjuster 25, as explained below in more detail. The first and second winders 23 and 24 are rotatable about a rotation center or axis (pivoting center) 02 that is substantially located in the center on the base member 22.

The first barrel adjuster 25 is arranged and configured such that the first shift cable 20 is substantially tangentially arranged relative to the first winder 23, as explained below in more detail. The second barrel adjuster 26 is arranged and configured such that the second shift cable 21 is substantially aligned with (directed toward) the rotation center 02 of the first and second winders 23 and 24, as also explained below in more detail. A cable guide part 27 is mounted to the base member 22 between the second barrel adjuster 26 and the second winder 24 to guide/direct the second inner wire 21a substantially tangentially onto the second winder 24.

The base member 22 is a plate-shaped member that basically includes a main mounting portion (plate) 22a, a main mounting portion 22a, a pivot support portion 22b, a first cable mounting section 22c and a second cable mounting section 22d. The main mounting portion 22a is mounted (attached) to one of the rear triangle ends or legs (i.e. one of the chain stays) 102a. The pivot support portion 22b is formed with the main mounting portion 22a. The first cable mounting section 22c is arranged on one side of the pivot support portion 22b, while the second cable mounting section 22d is arranged on an opposite side of the pivot support portion 22b from the first cable mounting section 22c. The first barrel adjuster 25 is adjustably (threadedly) mounted to the first cable mounting section 22c to form a first cable mounting portion therewith, while the second barrel adjuster 26 is adjustably (threadedly) mounted to the second cable mounting section 22d to form a second cable mounting portion therewith.

The main mounting portion 22a is preferably mounted to the frame 102 of a bicycle, i.e. to one of the rear triangle ends or legs (i.e. one of the chain stays) 102a, with a pair of bolts (not shown) that extend through the holes formed at the upper end of the main mounting portion 22a. Thus, the one of the rear triangle ends or legs (i.e. one of the chain stays) 102a preferably includes braze-ons or the like (not shown) to threadedly receive the bolts (not shown) in a conventional manner in order to fixedly attach the main mounting portion 22a to the frame 102. Of course, it will be apparent to those skilled in the art from this disclosure that the main mounting portion 22a can be attached to the frame using other techniques as needed and/or desired.

The pivot support portion 22b preferably has pivot opening with a pivoting support axle 30 received therein. The pivoting support axle 30, for example, includes of a conventional bolt member with a nut 31 and a cover clamp 32 attached thereto. The bolt member 30 has an enlarged head and an elongated center shank extending from the enlarged head. The shank is provided with male screw threads arranged at its end in order to threadedly receive the nut 31 thereon. The cover clamp 32 is mounted between the nut 31 and the first winder 23. The first and second winders 23 and 24 are mounted on the shank of the axle 30 between the pivot support portion 22b and the cover clamp 32 to be rotatable on the the pivoting support axle 30. The cover clamp 32 includes four axial flanges (nail parts) 32a formed therewith. An elliptical cover member 39 locks with resilience at the axial flanges 32a to cover the first and second winders 23 and 24, as best seen in FIG. 3.

The first cable mounting section 22c is substantially L-shaped (i.e. folded/bent at a 90-degree angle at an edge), as seen in FIGS. 2 and 3. The first cable mounting section 22c extends tangentially from an eccentrically shaped portion of the pivot support portion 22b. A threaded opening 22e is formed at the folded edge or flange of the first mounting section 22c. The first barrel adjuster 25 is threadedly received in the threaded opening 22e to form the first cable mounting portion of the cable winding conversion device 15. The first barrel adjuster 25 is placed along a tangent line relative to the first winder 23, as explained below in more detail.

The second cable mounting section 22d is similar to the first cable mounting section 22c. The second cable mounting section 22d has a substantially L-shaped portion that is folded or bent from the pivot support portion 22b (i.e. folded/bent at a 90-degree angle at an edge and then folded/bent again at a 90-degree angle at an edge). The second cable mounting section 22d extends in a radial direction from the pivot support portion 22b. After an elongated strip along the side of the second cable mounting section is folded or bent, the previously folded (bent elongated strip of the second cable mounting section 22d is folded again toward a free edge of the second cable mounting section 22d to form the configuration illustrated in FIGS. 2 and 3. A threaded opening 22f is formed at the folded edge or flange of the second mounting section 22d. The second barrel adjuster 26 is threadedly received in the threaded opening 22f. Therefore, the second barrel adjuster 26 is placed on the base member 22 along a radial line toward the pivoting support axle 30, as explained below in more detail.

The first winder 23 is mounted on the pivoting support axle 30 in a pivoting manner. Similarly, the second winder 24 is also mounted on the pivoting support axle 30 in a pivoting manner. The second winder 24 preferably has a larger winding radius than the first winder 23. Moreover, preferably, the first and second winders 23 and 24 are integrally formed together as a one-piece unitary member from a light weight, rigid material such as plastic or aluminum alloy. Therefore, the first and second winders 23 and 24 together form a substantially step-shaped cylindrical column-shape. The first winder 23 is configured to wind the first inner wire 20a on its circumference. Specifically, the first winder 23 includes a cable winding groove 23a formed around its periphery that guides the first inner wire 20a around the first winder 23. The second winder 24 is configured to wind the second inner wire 21a on its circumference. Specifically, the second winder 24 includes a cable winding groove 24a formed around its periphery that guides the second inner wire 21a around the second winder 24.

In the illustrated embodiment, the first winder 23, for example, has a circumference that is about one-half of the circumference of the second winder 24, as measured around the first and second winding grooves 23a and 24a, respectively. Thus, the second winder 24 has twice as much winding displacement (volume) per revolution as the first winder 23. In other words, the travel (distance of movement) of the second inner wire 21a that is winded on the second winder 24 is twice as long as the travel (distance of movement) of the first inner wire 20a that is winded on the first winder 23. Accordingly, for example, if the first inner wire 20a is pulled 10 millimeters (i.e. by the shift operating mechanism 126), the second inner wire 21a will be pulled about 10 millimeters. Also, when the first inner wire 20a is released or let out, the second inner wire 21a will be released or let out about twice as much as the first inner wire 20a.

The first winder 23 further includes a first internal locking part 35. The first internal locking part 35 fixedly attaches an end of the first inner wire 20a to the first winder 23. Specifically, the first internal locking part 35 includes a fixing bolt 35a and a fixing washer 35b that are arranged and configured to be coupled to the outer portion (near the circumference) of the second winder 24. The fixing bolt 35a is threadedly received in a mating threaded opening of the second winder 24. The fixing washer 35b is mounted on the fixing bolt 35a between an enlarged head of the fixing bolt 35a and the second winder 24 (i.e. adjacent to the first winding groove 23a). The first inner wire 20a is clamped between the fixing washer 35b and the second winder 24 by tightening the fixing bolt 35a. Thus, the position of the first inner wire 20a relative to the first winder is adjustable by loosening the fixing bolt 35a.

The second winder 24 further includes a second internal locking part 36. The second internal locking part 36 is fixed to the second winder 24. The second internal locking part 36 attaches an end of the second inner wire 21a to the second winder 24. Specifically, the second internal locking part 36 is a tubular, cup-shaped member with a slit 36a formed therein, which is arranged at the circumference of the second winder 24. The slit 36a is configured to receive the second inner wire 21a, while the tubular, cup-shaped portion of the second internal locking part 36 is configured to receive a column-shape cable locking clamp (i.e. a wire nipple or silencer) 21c of the second inner wire 21a, which is fixed at the end of the second inner wire 21a.

The first and second barrel adjusters 25 and 26 have identical structures. Therefore the first barrel adjuster 25 is mainly described. However, it will be apparent to those skilled in the art from this disclosure that the descriptions and illustrations of the first barrel adjuster 25 also apply to the second barrel adjuster 26. The first barrel adjuster 25 basically includes an outer locking clamp 25a and a pivoting operation part 25b. The outer locking clamp 25a is threadedly received in (screwed into) the threaded opening 22e of the first cable mounting section 22c at the same height as the first winding groove 23a of the first winder 23, as viewed in FIG. 3. Similarly, the second barrel adjuster 26 is arranged at the same height as the second winding groove 24a in an identical manner to the first barrel adjuster 25, as viewed in FIG. 3.

The outer locking clamp 25a is mounted within the pivoting operation part 25b to rotate therewith. And extend partially therethrough. The outer locking clamp 25a is threadedly received in the threaded opening 22e such that the outer locking clamp 25a moves axially when rotated by the pivoting operating part 25b. A coil spring 42 is arranged between the outer locking clamp 25a and the pivoting operation part 25b to normally bias the pivoting operation part 25b toward the first cable mounting section 22c. The pivoting operation part 25b and the first cable mounting section 22c are configured such that the pivoting operation part 25b is overrideably prevented from rotating (e.g. frictionally prevented from rotating by a protrusion and recess or detent arrangement) in a conventional manner.

The outer locking clamp 25a has a locking tube part 40 and a smaller screw tube part 41 with a stepped bore extending therethrough. The locking tube part 40 receives the first outer casing 20b therein. The screw tube part 41 extends in an opposite direction from the outer casing 20b through the pivoting operation part 25b into the threaded opening 22e. The first outer casing 20b is received (axially abutted or locked within against axial movement) to the inner circumference of the locking tube part 40. The outer circumference of the locking tube part 40 is in engagement with the pivoting operation part 25b to be unrotatable and movable along the direction of the axis relative thereto. The pivoting operation part 25b has a space between itself and the screw tube part 41, and the coil spring 42 is mounted in compressed state in the space. An edge of the pivoting operation part 25b contacts the first cable mounting section 22c, and the pivoting operation part 25b is preferably detented by a specific or predetermined phase of angular rotation. Thus, the pivoting operation part 25b can be easily rotated in relatively precise intervals.

The first barrel adjuster 25 is placed such that the first inner wire 20a is directed in a direction that tangentially meets the cable winding groove 23a of the first winder 23, as seen in FIGS. 2 and 3. Thus, the stepped bore of the outer locking clamp 25a (i.e. the first cable receiving opening of the first cable mounting portion) is directed tangentially toward the first cable winding groove 23a of the first winder 23 such that the first inner wire 20a is directed tangentially onto the first winder 23 (i.e. tangentially onto the first cable winding groove 23a). Therefore, in the first barrel adjuster 25, the first inner wire 20a is linearly placed tangentially toward the first cable winding groove 23a.

In addition, the second barrel adjuster 26 is placed at the same height as the cable winding groove 24a of the second winder 24 as mentioned above. However, on the other hand, the second barrel adjuster 26 is directed radially toward the rotation center 02 of both winders 23 and 24 as viewed in FIG. 2. However, in the second barrel adjuster 26, the second inner wire 21a is linearly directed radially toward the rotation center 02, and then is bent toward the second cable winding groove 24a to extend linearly tangentially toward the second winding groove 24a, as best seen in FIG. 2. Thus, the stepped bore of the second barrel adjuster 26 (i.e. the second cable receiving opening of the second cable mounting portion) is directed radially toward the rotation center 02 of the first and second winders 23 and 24 such that the second inner wire 21a is directed radially toward the second winder 24. To reduce the friction caused by bending of the second inner wire 21a, a cable guide part 27 is provided near the second barrel adjuster 26 (between the second barrel adjuster 26 and the second winder 24) to bend the second inner wire 21a from its initial radial orientation to a tangential orientation into the second cable winding groove 24a onto the second winder 24.

The cable guide part 27 basically includes a guide support axle 43 and a guide roller 44 mounted on the guide support axle 43. The guide support axle 43 is arranged at the second cable mounting section 22d of the base member 22 near the second barrel adjuster 26. The guide roller 44 is mounted on the guide support axle 43 in a pivoting/rotatable manner. The guide roller 44 has a cable winding groove 44a extending around it that is placed at the same height as the cable winding groove 24a of the second winder 24 and the second barrel adjuster 26, as seen in FIG. 3. The guide roller 44 is arranged at a location where the second inner wire 21a that extending toward the rotation center 02 can contact with the cable guide groove 44a.

In the cable winding conversion device 15 configured in the manner described above in accordance with the present invention, as the first inner wire 20a moves by operation of the speed operation part 126, the first winder 23 pivots accordingly, and thus, the second winder 24 also pivots together with the first winder. When the winders 23 and 24 pivot, the second inner wire 21a moves twice as long a distance as the first inner wire 20a, and makes the interior speed hub 12 shift gears. Since the second inner wire 21a is guided to the guide roller 44, even though the second barrel adjuster 26 is directed toward the rotation center 02, the movement of the second inner wire 21a is smooth, and the conversion efficiency hardly lowers.

In addition, the second shift cable 21 is placed to be directed toward the rotation axis (pivoting center) 02 because the cable winding radius of the second winder 24 is larger than the first winder with the first shift cable 20 because the winding radius of the second winder 24 is relatively large, if the second barrel adjuster 26 of the second shift cable 21 were placed tangentially relative to the second winder 24 such a position is widely separated/spaced from the pivoting center as compared to when placed toward the rotations axis 02 of the second winder 24. Therefore, even if the first barrel adjuster 25 is placed along the tangent line of the first winder 23 as discussed above, the distance between the cables 20 and 21 and the rotation axis (pivoting center) 02 is relatively small because this is determined by the distance between the first shift cable 20 tangentially aligned with the relatively small first winder 23 and the rotation axis (pivoting center) 02. Therefore, the two shift cables 20 and 21 and the rotation axis (pivoting center) 02 are relatively closer together, and both shift cables 20 and 21 are also easily placed on the frame 102 even if the base member 22 is placed on the frame 102. In other words, due to the arrangements explained herein, both shift cables 20 and 21 and the base member 22 can be easily placed on the frame 102.

In this embodiment, both winders 23 and 24 are circular shaped with their centers being aligned with the rotation center 02. However, it will be apparent to those skilled in the art from this disclosure that other configurations are possible as needed and/or desired. Some examples of other configurations are discussed below with reference to other preferred embodiments of the present invention.

Second Embodiment

Figure 4:
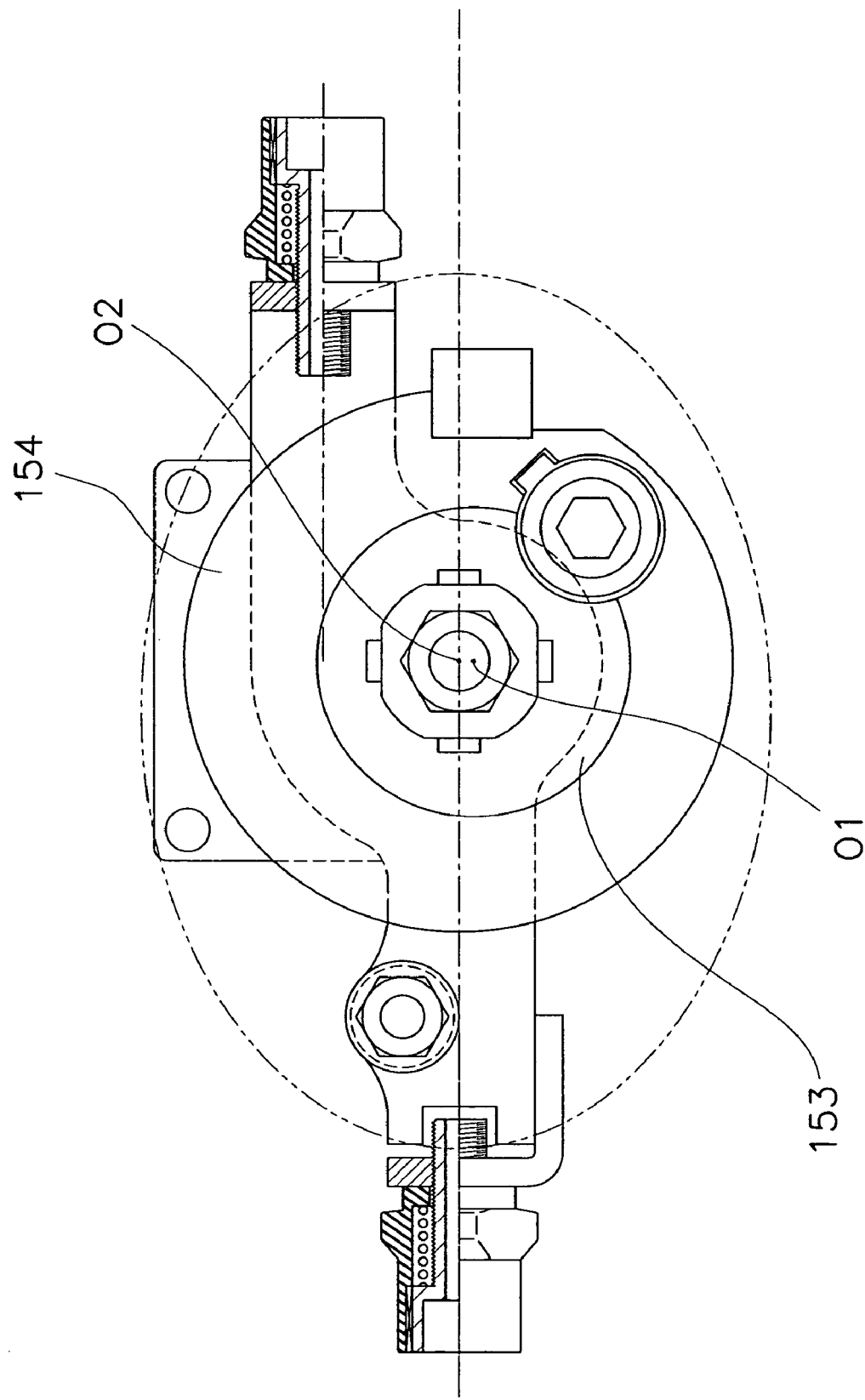
FIG. 4 is an enlarged side elevational view of a cable winding conversion device in accordance with a second embodiment of the present invention that is designed to be mounted on the bicycle illustrated in FIG. 1 in place of the cable winding conversion device illustrated in FIGS. 2 and 3, with portions removed and portions broken away for the purpose of illustration (i.e. a flat/top part sectional view) and with the cables removed for the purpose of illustration.

Referring now to FIG. 4, a cable winding conversion device in accordance with a second embodiment of the present invention will now be explained. This second embodiment is identical to the first embodiment, except the cable winding conversion device of this second embodiment includes a modified circular first winder 153 and a second winder 154. The modified circular first winder 153 has its center offset from the rotation center 02. Thus, the cable winding conversion device of this second embodiment is designed to be mounted on the bicycle 101 in place of the cable winding conversion device 15 of the first embodiment between the first and second cables 20 and 21. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. However, it will be apparent to those skilled in the art from this disclosure that the descriptions and illustrations of the first embodiment also apply to this second embodiment, except as explained and illustrated herein.

In the first embodiment, both winders 23 and 24 are circular, and placed with aligning centers with the rotation center or axis (pivoting center) 02. However, at least one or both winders 23 and 24 may be circular shaped and eccentrically placed relative to the rotation center or axis 02. In this embodiment of FIG. 4, the center 01 of the first winder 153 is eccentric (offset from) relative to the pivoting axis center 02. The second winder 154 is preferably identical to the second winder 24 of the first embodiment, except that the second winder 154 is integrally formed with the modified first winder 153. However, it will be apparent to those skilled in the art from this disclosure that the second winder 154 can also have its center offset from the rotation center 02 in addition to or instead of the first winder 153, as needed and/or desired. Descriptions about other configurations are omitted because they are the same as the first embodiment.

By configuring the winders 153 and 154 as explained herein, the ratio of the travel distance of the second inner wire 21a relative to the travel distance of the first inner wire 20a can be changed along the pivoting position of the winders 153 and 154 during pivoting. In addition, the second winder 154 may be eccentric to the pivoting axis center 02, and both winders 153 and 154 may also be eccentric from the pivoting center. In any case, at least one of the winders 153 and 154 is preferably eccentrically placed circular shaped member in this embodiment such that at least one of the first and second winders 153 and 154 (winder 153 in this embodiment) has a first portion and a second portion with a distance between the rotation center 02 and an outer peripheral edge of the second portion being different from the first portion. Moreover, due to this configuration, at least one of the first and second winders 153 and 154 (winder 153 in this embodiment) has a varying winding radius that gradually changes. Of course, if the second winder 154 has its center offset from the rotation axis 02, its center can be aligned with the center 01 of the first winder 153 or can be offset from the center 01.

Third Embodiment

Figure 5:
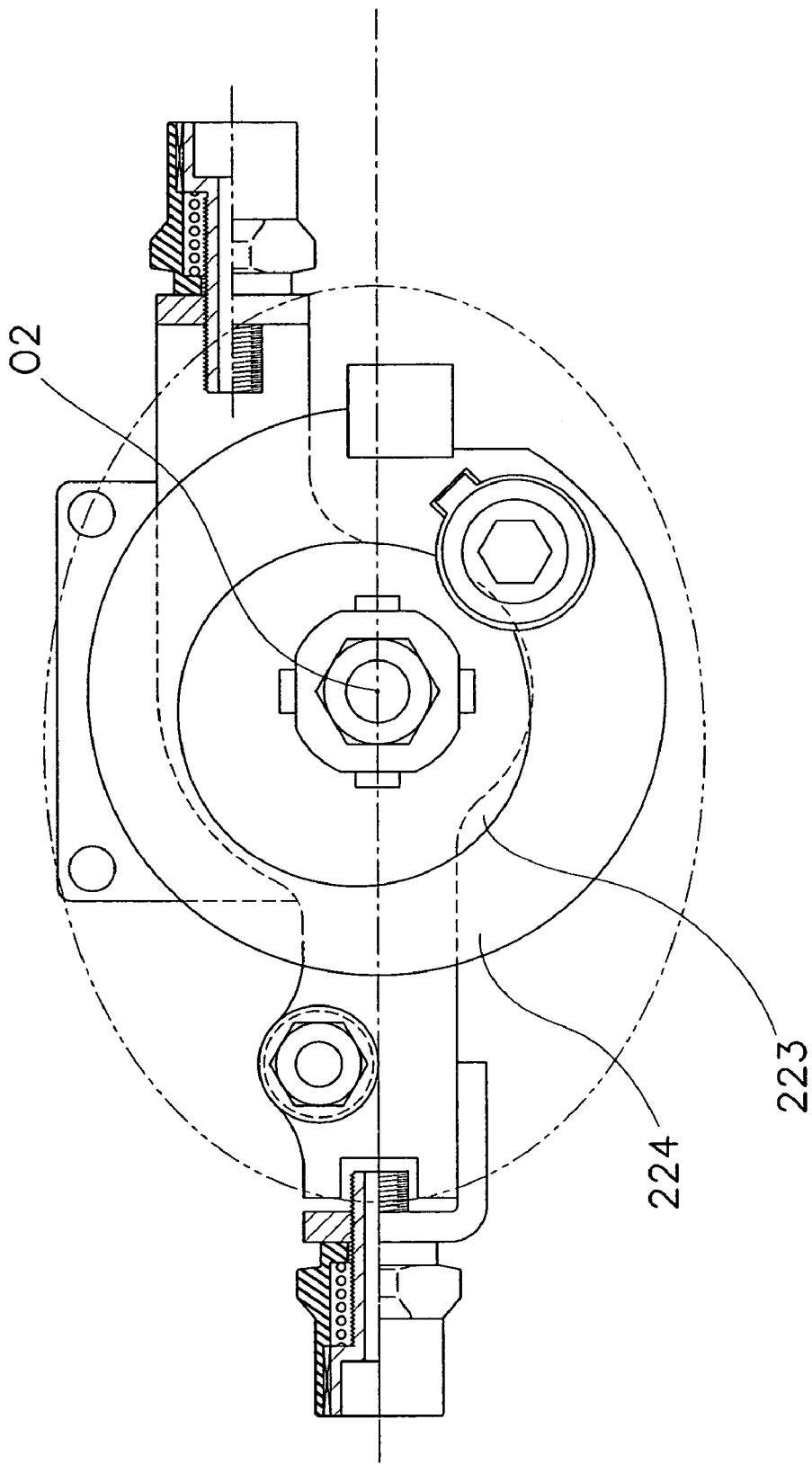
FIG. 5 is an enlarged side elevational view of a cable winding conversion device in accordance with a third embodiment of the present invention that is designed to be mounted on the bicycle illustrated in FIG. 1 in place of the cable winding conversion device illustrated in FIGS. 2 and 3, with portions removed and portions broken away for the purpose of illustration (i.e. a flat/top part sectional view) and with the cables removed for the purpose of illustration.

Referring now to FIG. 5, a cable winding conversion device in accordance with a third embodiment of the present invention will now be explained. This third embodiment is identical to the first embodiment, except the cable winding conversion device of this third embodiment includes a modified first winder 223 and a second winder 224. The modified first winder 223 is eccentrically shaped (e.g. cam shaped) relative to the rotation center 02, as opposed to being circular shaped as in the first embodiment. Thus, the cable winding conversion device of this third embodiment is designed to be mounted on the bicycle 101 in place of the cable winding conversion device 15 of the first embodiment between the first and second cables 20 and 21. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. However, it will be apparent to those skilled in the art from this disclosure that the descriptions and illustrations of the first embodiment also apply to this third embodiment, except as explained and illustrated herein.

In the first embodiment, both winders 23 and 24 were configured in a circular-disc shape with their centers aligned with the rotation axis (pivoting center) 02. However, at least one or both winders 23 and 24 may be formed such that the distance from a pivoting center 02 (winding radius) gradually changes. As mentioned above in the discussion of the second embodiment, this can be accomplished by providing a circular shaped winder(s) with the center(s) offset from the rotation center 02. However, in this embodiment illustrated in FIG. 5, this is accomplished by providing a first winder 223 that is formed in an eccentric (non-circular) shape such that the distance from the pivoting center 02 (winding radius) gradually changes. The second winder 224 is preferably identical to the second winder 24 of the first embodiment, except that the second winder 224 is integrally formed with the modified first winder 223. However, it will be apparent to those skilled in the art from this disclosure that the second winder 224 can also be eccentrically shaped (non-circular) relative the rotation center 02 in addition to or instead of the first winder 223, as needed and/or desired. Descriptions of other configurations are omitted because they are the same as the first embodiment.

By configuring the winders 223 and 224 as explained herein, the ratio of the travel distance of the second inner wire 21a relative to the travel distance of the first inner wire 20a can be changed along the pivoting position of the winders 223 and 224 during pivoting. In addition, the second winder 224 may be formed in the above shape, and both winders 223 and 224 may also be formed in the above shape. In any case, at least one of the winders 223 and 224 is preferably an eccentrically shaped member in this embodiment such that at least one of the first and second winders 223 and 224 (winder 223 in this embodiment) has a first portion and a second portion with a distance between the rotation center 02 and an outer peripheral edge of the second portion being different from the first portion. Moreover, due to this configuration, at least one of the first and second winders 223 and 224 (winder 223 in this embodiment) has a varying winding radius that gradually changes. Of course, if the second winder 224 is eccentrically shaped relative to the rotation axis 02, it can have a shape similar to the first winder 223 or can have a different eccentric shape.

Fourth Embodiment

Figure 6:
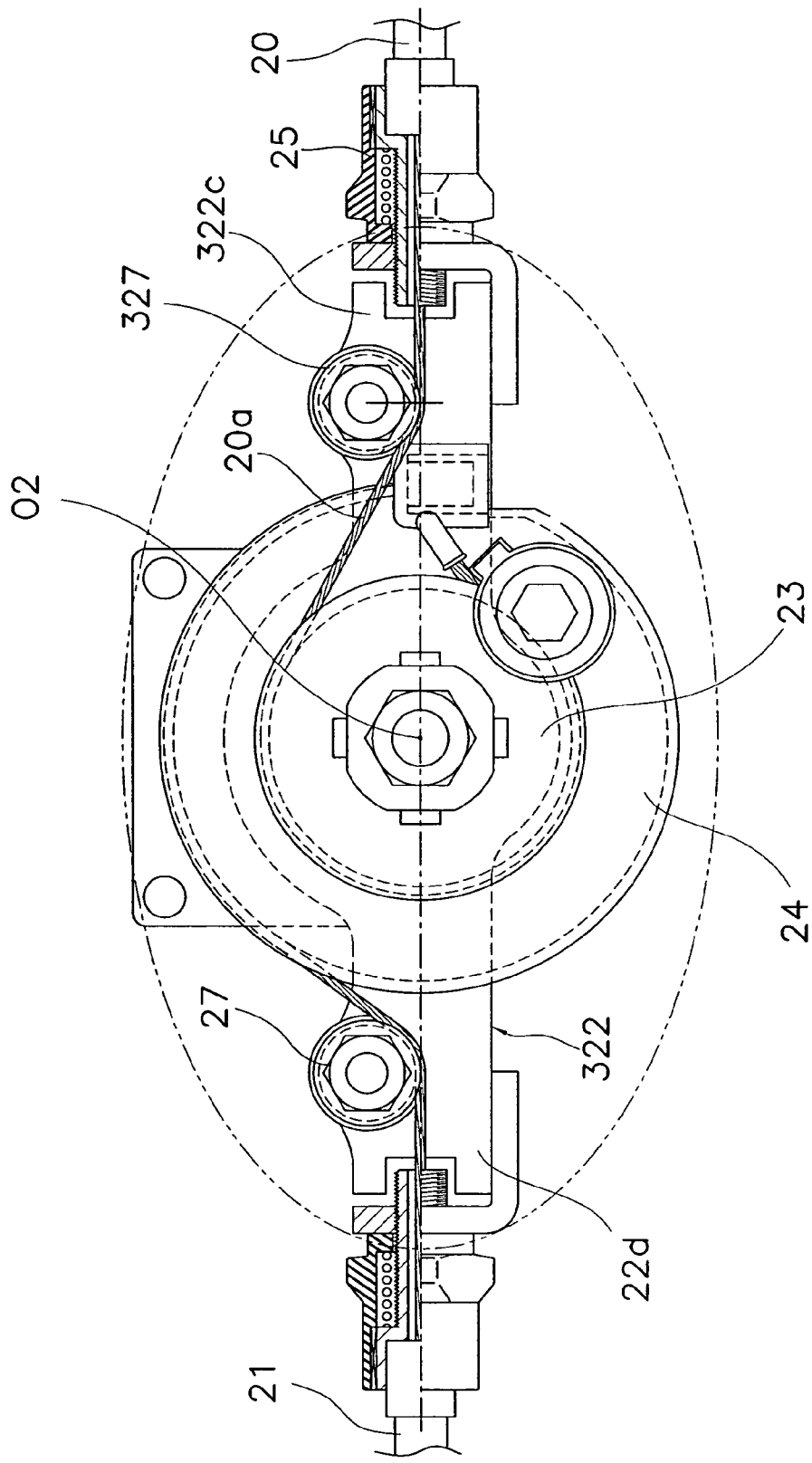
FIG. 6 is an enlarged side elevational view of a cable winding conversion device in accordance with a fourth embodiment of the present invention that is designed to be mounted on the bicycle illustrated in FIG. 1 in place of the cable winding conversion device illustrated in FIGS. 2 and 3, with portions removed and portions broken away for the purpose of illustration (i.e. a flat/top part sectional view).

Referring now to FIG. 6, a cable winding conversion device in accordance with a fourth embodiment of the present invention will now be explained. This fourth embodiment is identical to the first embodiment, except the cable winding conversion device of this fourth embodiment includes a modified cable mounting section 322c with a cable guide part 327. The modified cable mounting section 322c is arranged such that the first barrel adjuster 25 directs the first cable 20 (i.e. the first inner wire 20a and the first outer casing 20b) toward the rotation center 02 of the first and second winders 23 and 24. The cable guide part 327 then directs the inner wire 20a tangentially onto the first winder 23. In other words, the cable winding conversion device of this fourth embodiment includes a first cable mounting portion that is substantially identical to the second cable mounting portion (i.e. a mirror image). Thus, the cable winding conversion device of this fourth embodiment is designed to be mounted on the bicycle 101 in place of the cable winding conversion device 15 of the first embodiment between the first and second cables 20 and 21. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. However, it will be apparent to those skilled in the art from this disclosure that the descriptions and illustrations of the first embodiment also apply to this fourth embodiment, except as explained and illustrated herein.

In the first embodiment, the first barrel adjuster 25 was placed toward the direction that tangentially meets the first winder 23. However, the first barrel adjuster 25 may be placed toward the rotation (pivoting) center 02 in addition to the second barrel adjuster 26. In this fourth embodiment illustrated in FIG. 6, the first cable mounting section 322c of the base member 322 to which the first barrel adjuster 25 is mounted goes to the radial direction in a manner identical to the second cable mounting section 22d. The shape is formed to be a mirror image by placing the pivoting center 02 of the second cable mounting section 22d in the center. Therefore, the first barrel adjuster 25 is also placed without being separated (spaced) from the pivoting center. The cable guide part 327 is mounted to the first cable mounting section 322c between the first winder 23 and the first barrel adjuster 25. The cable guide part 327 has an identical structure to the cable guide part 27 that is mounted on the second cable mounting section 22d. In this case, since the first barrel adjuster 25 is also placed toward the rotation (pivoting) center 02, both shift cables 20 and 21 and the pivoting center 02 can be set in line (aligned), and both shift cables 20 and 21 and the base member 322 are more easily placed on the frame 102. In addition, since the first inner wire 20a that has a curvature toward the direction of the tangent line of the first winder 23 from the first barrel adjuster 25 that is placed toward the pivoting center, is guided to the cable guide part 327, the movement of the first inner wire 20a becomes smooth, and lowering of the conversion efficiency by friction can be reduced.

In the preferred embodiments discussed above, the first winder and the second winder are preferably integrally formed together as a one-piece, unitary member. However, it will be apparent to those skilled in the art from this disclosure that they may be formed separately as needed and/or desired. In addition, in the preferred embodiments discussed above, the pivoting centers of both winders were aligned. However, it will be apparent to those skilled in the art from this disclosure that they may be separated (spaced from each other) as needed and/or desired.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cable winding conversion device comprising:
    a base member configured to be mounted to a frame;
    a first winder rotatably mounted to the base member, the first winder being configured to wind a first inner wire of a first cable;
    a second winder fixedly mounted to the first winder to move with the first winder, the second winder being configured to wind a second inner wire of a second cable, the second winder having at least a portion that has a winding radius that is larger than a winding radius of the first winder;
    a first cable mounting portion coupled to the base member to direct the first inner wire of the first cable onto the first winder, the first cable mounting portion being configured to receive a first outer casing of the first cable, the first cable mounting portion including a first cable receiving opening; and
    a second cable mounting portion coupled to the base member to direct the second inner wire onto the second winder, the second cable mounting portion being configured to receive a second outer casing of the second cable, the second cable mounting portion including a second cable receiving opening with a longitudinal center axis that passes substantially through a rotation center of the first and second winders as viewed along a direction parallel to the rotation center of the first and second winders.

2. The cable winding conversion device according to claim 1, wherein
    the first cable mounting portion is mounted in a position relative to the first winder such that the first cable receiving opening is directed substantially tangentially relative to a first winding surface of the first winder.

3. The cable winding conversion device according to claim 2, wherein
    the base member includes a cable guide part arranged between the second cable receiving opening and the second winder to guide the second inner wire substantially tangentially onto a second winding surface of the second winder.

4. The cable winding device according to claim 1, wherein
    at least one of the first and second winders has a first portion and a second portion with a distance between the rotation center and an outer peripheral edge of the second portion being different from the first portion.

5. The cable winding conversion device according to claim 1, wherein
    the first cable mounting portion is mounted in a position relative to the first winder such that the first cable receiving opening is directed toward the rotation center of the first and second winders.

6. The cable winding conversion device according to claim 5, wherein
    the base member includes a first cable guide part arranged between the first cable receiving opening and the first winder to guide the first inner wire substantially tangentially onto a first winding surface of the first winder.

7. The cable winding conversion device according to claim 6, wherein
    the base member includes a second cable guide part arranged between the second cable receiving opening and the second winder to guide the second inner wire substantially tangentially onto a second winding surface of the first winder.

8. The cable winding conversion device according to claim 7, wherein
    the first and second cable guide parts include first and second guide rollers, respectively, and the first and second guide rollers are rotatably mounted to the base member.

9. The cable winding conversion device according to claim 1, wherein
    the base member includes a cable guide part arranged between the second cable receiving opening and the second winder to guide the second inner wire substantially tangentially onto a second winding surface of the first winder.

10. The cable winding conversion device according to claim 1, wherein
the first and second winders are circular shaped members with different winding radii as viewed along the rotation center of the first and second winders, and the first and second winders include first and second winding grooves to guide the first and second inner wires around the circumferences thereof, respectively.

11. The cable winding conversion device according to claim 10, wherein
the first and second winders have their centers aligned with the rotation center of the first and second winders.

12. The cable winding conversion device according to claim 10, wherein
at least one of the first or second winders has a circular shape with its center off-set from the rotation center of the first and second winders.

13. The cable winding conversion device according to claim 1, wherein
at least one of the first or second winders has a circular shape with its center off-set from the rotation center of the first and second winders.

14. The cable winding conversion device according to claim 1, wherein
at least one of the first and second winders has a varying winding radius that gradually changes.

15. A cable winding conversion device comprising:
a base member configured to be mounted to a frame, with a the cable guide part that includes a guide roller rotatably mounted to the base member;
a first winder rotatably mounted to the base member, the first winder being configured to wind a first inner wire of a first cable about a first winding surface of the first winder;
a second winder fixedly mounted to the first winder to move with the first winder, the second winder being configured to wind a second inner wire of a second cable about a second winding surface of the second winder, the second winder having at least a portion that has a winding radius that is larger than a winding radius of the first winder;
a first cable mounting portion mounted to the base member in a position relative to the first winder to direct the first inner wire of the first cable onto the first winder, the first cable mounting portion being configured to receive a first outer casing of the first cable, the first cable mounting portion including a first cable receiving opening that is directed substantially tangentially relative to the first winding surface of the first winder; and
a second cable mounting portion coupled to the base member to direct the second inner wire onto the second winder, the second cable mounting portion being configured to receive a second outer casing of the second cable, the second cable mounting portion including a second cable receiving opening that is directed toward a rotation center of the first and second winders with the base cable guide part being arranged between the second cable receiving opening and the second winder to guide the second inner wire substantially tangentially onto the second winding surface of the second winder.

16. The cable winding conversion device according to claim 15, wherein
the first and second winders are circular shaped members with different winding radii as viewed along the rotation center of the first and second winders, and the first and second winders include first and second winding grooves to guide the first and second inner wires around the circumferences thereof, respectively.

17. The A cable winding conversion device comprising:
a base member configured to be mounted to a frame, with a the cable guide part that includes a guide roller rotatably mounted to the base member;
a first winder rotatably mounted to the base member, the first winder being configured to wind a first inner wire of a first cable; a second winder fixedly mounted to the first winder to move with the first winder, the second winder being configured to wind a second inner wire of a second cable, the second winder having at least a portion that has a winding radius that is larger than a winding radius of the first winder;
a first cable mounting portion coupled to the base member to direct the first inner wire of the first cable onto the first winder, the first cable mounting portion being configured to receive a first outer casing of the first cable, the first cable mounting portion including a first cable receiving opening; and
a second cable mounting portion coupled to the base member to direct the second inner wire onto the second winder, the second cable mounting portion being configured to receive a second outer casing of the second cable, the second cable mounting portion including a second cable receiving opening that is directed toward a rotation center of the first and second winders with the base cable guide part being arranged between the second cable receiving opening and the second winder to guide the second inner wire substantially tangentially onto the second winding surface of the second winder.

18. The cable winding device according to claim 17, wherein
at least one of the first and second winders has a first portion and a second portion with a distance between the rotation center and an outer peripheral edge of the second portion being different from the first portion.

* * * * *